US005212368A

United States Patent [19]

Hara

[11] Patent Number: 5,212,368

[45] Date of Patent: May 18, 1993

[54] TOY APPARATUS WITH CARD READER UNIT AND A CARD HAVING GAME PARAMETER DATA

[75] Inventor: Hiroshi Hara, Chofu, Japan

[73] Assignee: Epoch Company, Ltd., Tokyo, Japan

[21] Appl. No.: 709,304

[22] Filed: Jun. 3, 1991

[51] Int. Cl.[5] .............................................. G06F 15/20

[52] U.S. Cl. .................................. 235/375; 273/93 C; 235/487

[58] Field of Search ............... 235/375, 487; 273/93 C

[56] References Cited

U.S. PATENT DOCUMENTS 5,026,058 6/1991 Bromley ............................ 273/93 C

*Primary Examiner*—Harold Pitts

*Attorney, Agent, or Firm*—Staas & Halsey

[57] ABSTRACT

A toy apparatus includes a card reader unit for use with a card which has game parameter data stored thereon in machine-readable form. The toy apparatus also includes a calculation unit which generates player turn result data or game result data in dependence upon game parameter data read from a card. In a preferred embodiment, the card reader unit is designed to read game parameter data stored as a barcode on the card. In addition, a data storage medium of the present invention stores game parameter data for use with a toy apparatus including a card reader unit. In the preferred embodiment, the data storage medium is a card which stores game parameter data. Also, in the preferred embodiment, the game parameter data is stored as a barcode on the card, and the game parameter data stored on the card may be selected by a user.

16 Claims, 5 Drawing Sheets

TOY APPARATUS WITH CARD READER UNIT AND A CARD HAVING GAME PARAMETER DATA

BACKGROUND OF THE INVENTION

1. Field of the Invention

The present invention generally relates to a toy apparatus including a card reader unit, and a card having game parameter data, and more particularly, a toy apparatus including a bar code reader unit and a card having game parameter data stored thereon as a bar code.

2. Description of the Related Art

There are several known games which use cards on which, for example, pictures, letters and marks are printed to show a given characteristic or strength of each card. Players use the cards to determine a player turn result or a game result. Often, these cards are printed with popular fictional or non-fictional characters to attract users of such games to collect the cards.

Because of the time and difficulty required to compare, for example, different pictures, letters and marks (hereinafter "card game parameter data" or "game parameter data"), to determine a player turn result or a game result, such games usually generate little interest. Also, the game parameter data on the cards are fixed so that the effects of a turn result or a game result on such game parameter data can not be readily changed. Further, conditions which enhance or detract from the strength of such game parameter data cannot be readily determined and applied to the game. Also, there are limited strategies which players can use with such cards.

SUMMARY OF THE INVENTION

Accordingly, it is an object of the present invention to provide a toy apparatus in which a comparison of different toy game parameter data can be readily performed.

It is also an object of the present invention to provide a toy apparatus in which card game parameter data can be machine-read and modified to reflect the effects of a turn result or a game result on such game parameter data.

Accordingly, it is also an object of the present invention to provide a toy apparatus in which conditions that enhance or detract from the strength of card game parameter data can be readily determined and applied to the game.

Accordingly, it is also an object of the present invention to increase the strategies which can be employed by a player to modify the card game parameter data.

To satisfy the above objects, there is provided a toy apparatus for use with a card having game parameter data, which includes a card reader unit for reading the game parameter data from the card, and a calculation unit, operatively coupled to the card reader unit, for receiving the game parameter data from the card reader unit and calculating at least one of turn and game result data, based on the game parameter data.

There is also provided a data storage medium which stores game parameter data for use with a toy apparatus having a card reader unit, the data storage medium comprising a card having machine-readable game parameter data stored thereon.

DESCRIPTION OF THE PREFERRED EMBODIMENTS

Figure 1:
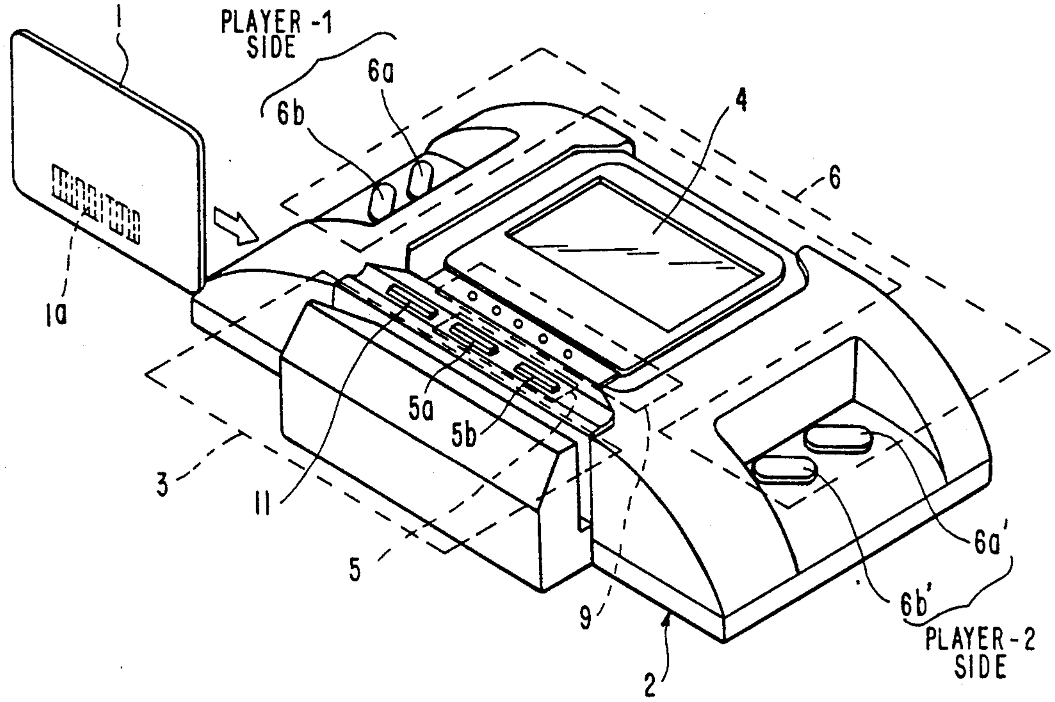
FIG. 1 is a perspective view of a toy apparatus in accordance with a preferred embodiment of the present invention.

As shown in FIG. 1, the toy apparatus has a body 2 which includes a card reader unit 3, a display unit 4, a game mode selection unit 5, a key unit 6, a light unit 9 and ON/OFF key 11. The toy apparatus operates as part of the game with at least one card 1 and preferably a plurality of different cards 1, as explained later. A calculation unit 7 (not shown in FIG. 1) is a microprocessor in the preferred embodiment, but could be an arithmetic logic unit or an adder circuit, for example. The calculation unit 7 is housed internally in the body 2.

Figure 3:
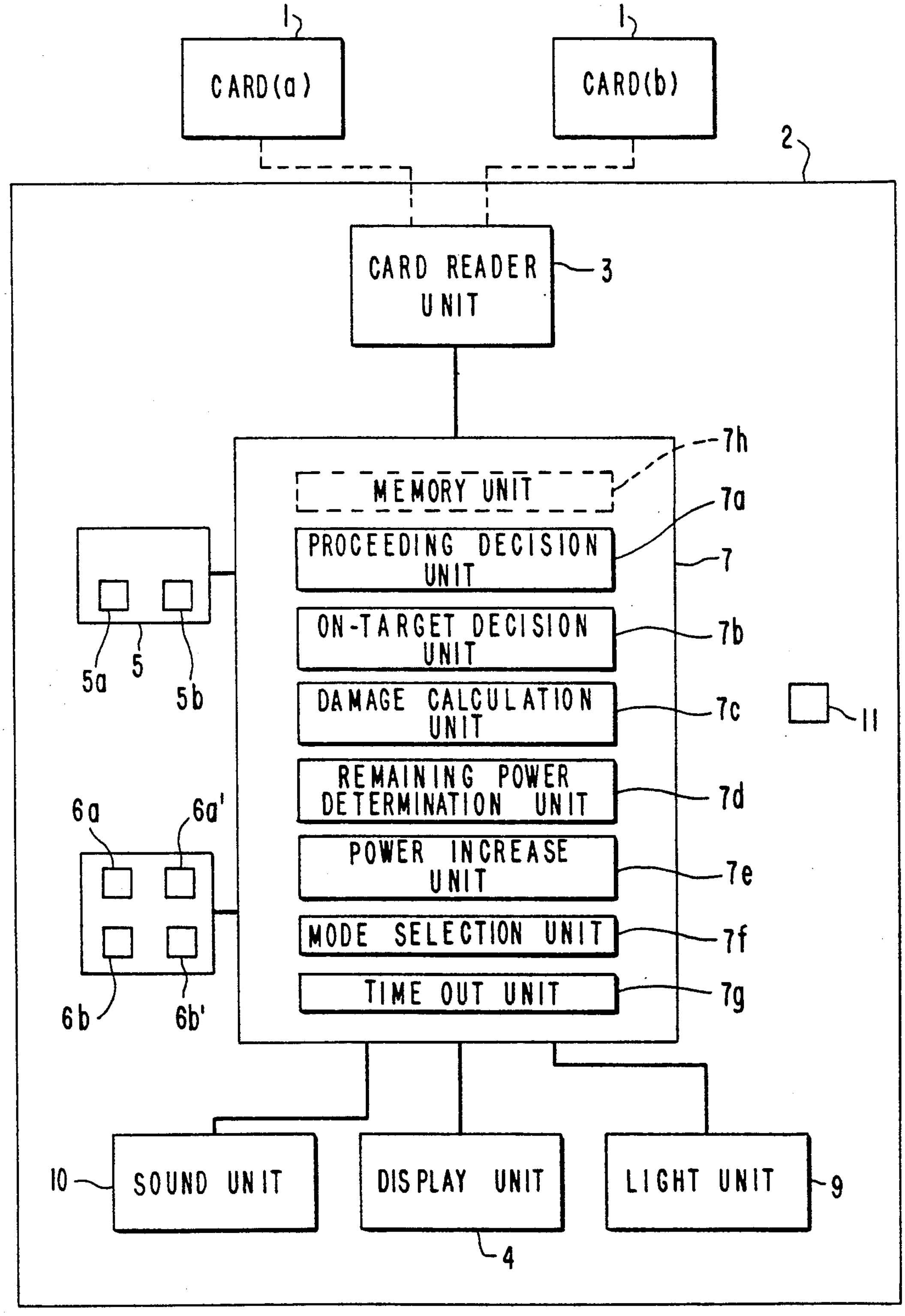
FIG. 3 is a block diagram illustrating the functional components of a toy apparatus in accordance with a preferred embodiment of the present invention.

The card reader unit 3 is operable to read game parameter data stored in this embodiment as a bar code 1*a* card 1. After the appropriate game parameter data is machine-read to the toy apparatus of the preferred embodiment, keys included within the key unit 6 are operable by a player to initiate a calculation of either turn result data or game result data by the calculation unit 7. Keys 6*a*, 6*b*, 6*a*', 6*b*' are included within the key unit 6 to initiate a calculation to modify the game parameter data with the calculation unit in different ways (discussed in greater detail in the following section) for each of the player-1 and player-2 sides. The selection unit 5 includes select key 5*a* and select key 5*b* (FIG. 3) to select and set, respectively, one of plural game modes (explained in greater detail in the following section). The display unit 4 can be used to generate a variety of displays including a display of the game parameter data, a display of the turn result data or a display of the game result data. The light unit 9 is provided on the body 2 to indicate appropriate information to a player of the toy apparatus. Further, a sound unit 10 (not shown in FIG. 1) is included within the body 2 so that appropriate sound information can be provided to a player of the toy apparatus.

A general description of the game using the toy apparatus and plurality of different cards 1 is explained as follows. The plurality of different cards 1 includes player cards 1 and condition cards 1. A player card 1 has a visual representation of a character soldier, and a bar code which stores game parameter data for that character soldier. The game parameter data for each character soldier includes power data, offensive data and defensive data corresponding to the power, offensive strength and defensive strength, respectively, of the character soldier.

The condition cards 1 include power cards 1, weapon cards 1 and protector cards 1. The power cards 1 are used to modify the game parameter data of a particular character soldier by enhancing or detracting from the power data included within the parameter data for the particular character soldier. Each power card 1 also includes a visual representation of an object. For example, one of the power cards 1 includes a picture of a battery. Likewise, the weapon cards are used to modify the offensive data included within the game parameter data for a particular character soldier. Each weapon card 1 includes a visual representation of an object. For example, one of the weapon cards 1 includes a picture of a hammer. Similarly, the protector cards 1 are used to enhance or detract from the defensive data included within the game parameter data for a particular character soldier. Each of the protector cards 1 also includes a visual representation of an object. For example, one of the protector cards 1 includes a picture of a toothbrush.

During operation of the game using the toy apparatus of the present invention, a player selects one of the player cards 1 which represents a character soldier. At an appropriate point in the operation of the toy apparatus, the player slides the player card 1 through the card reader unit 3 of the toy apparatus. In this manner, the game parameter data for the selected character soldier is machine-read by the toy apparatus. Depending on which of the plural game modes is selected, another player may select a character soldier and input the game parameter data corresponding to that character soldier into the toy apparatus by sliding the selected player card 1 through the card reader unit 3. Alternatively, the calculation unit 7 generates game parameter data for a second player. In either case, the game parameter data for both the player-1 and player-2 sides is displayed on the display 4.

The toy apparatus indicates whether player-1 or player-2 is to proceed first. Assuming for purposes of this discussion that the calculation unit 7 determines that player-1 is to proceed first, player-1 has the option to select either the power key 6a or the battle key 6b. If player-1 decides to depress the power key, the calculation unit 7 determines an amount of power data to be added to the existing power data displayed on the display unit 4 for player-1. On the other hand, player-1 may elect to operate the battle key 6b to initiate an attack on player-2. In this case, the calculation unit 7 determines whether a hit or a miss occurred and, when a hit occurs, calculates the amount of damage to be deducted from the power data of player-2. The toy apparatus then indicates that player-2 is to proceed with similar options by selecting either power key 6a' or battle key 6b'. The game proceeds until the deduction of damage from the power data of either player-1 or player-2 causes a value of the power data to be reduced to zero, or to fall below zero.

Figure 2:
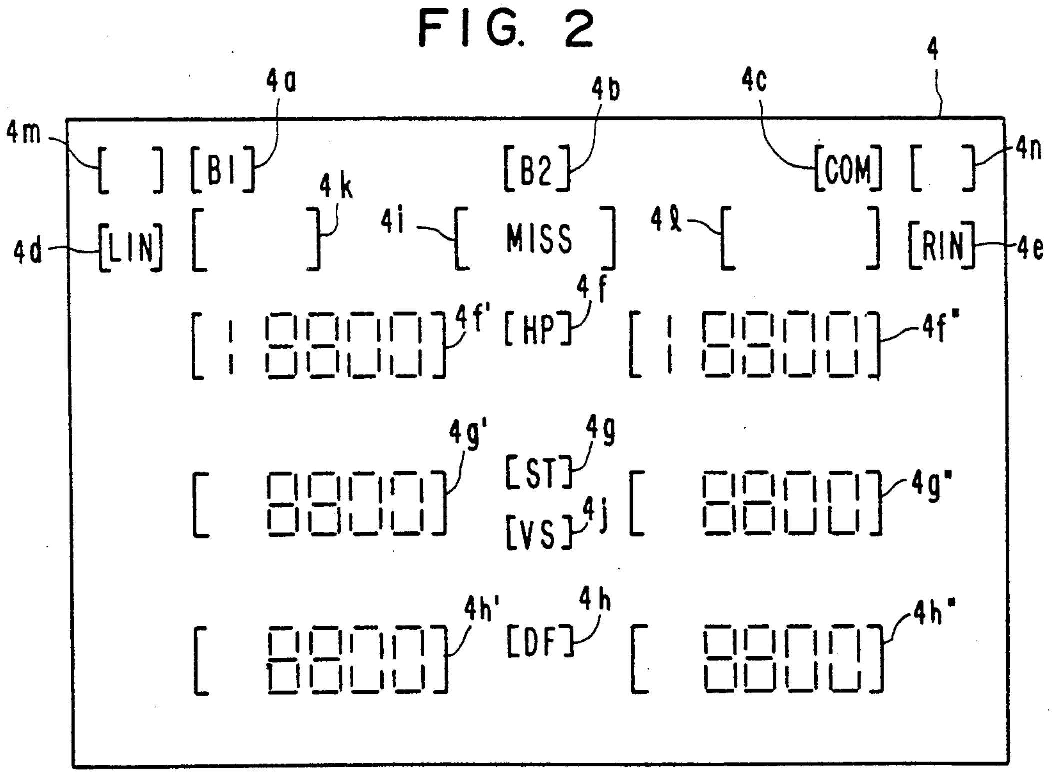
FIG. 2 is a view of a display of a toy apparatus in accordance with a preferred embodiment of the present invention.

A detailed description of the display unit 4 is now provided. As illustrated by FIG. 2, display unit 4 is a liquid crystal display (LCD) in the preferred embodiment of the present invention and includes display fields 4a, 4b and 4c. The labels "B1", "B2" and "COM" in fields 4a, 4b, 4c, respectively, refer to the plural game modes previously mentioned. B1 mode is a 1-player mode in which a single player uses game parameter data of one card 1 to play against the calculation unit 7 with game parameter data represented by another card 1. B2 mode refers to a game mode in which two players are each represented by game parameter data included on a first card 1 and a second card 1, respectively. COM mode refers to a game mode in which one player, represented by game parameter data on a card 1 plays against game parameter data generated by the calculation unit 7.

The display unit 4 also includes fields 4d, 4e which display "LIN" and "RIN", respectively, to prompt an operator of the toy apparatus to insert a card 1 at an appropriate time during operation of the toy apparatus. Field 4f is labeled "HP" which indicates power data included within the game parameter data. The separate fields 4f' and 4f'' relate to the field 4f and include power data for player-1 and player-2, respectively. Similarly, field 4g is labeled "ST" which indicates offensive data. The separate fields 4g' and 4g'' relate to field 4g and include offensive data for player-1 and player-2, respectively. Field 4h is labeled "DF" which indicates defensive data. The separate fields 4h' and 4h'' relate to field 4h and indicate the defensive data included within the game parameter data for player-1 and player-2, respectively. Field 4i is labeled "MISS" and indicates a misread of a card 1 by card reader unit 3 or that an attack by either player-1 or player-2 was unsuccessful. Field 4j is labeled "VS" and represents the word "versus". Field 4j is used to indicate the adversaries in a game depending on which of the plural game modes is selected. Fields 4k and 4l indicate comment fields which can be used, for example, to indicate comments made by player-1 or player-2 when the subtraction of power by the calculation unit 7 is particularly severe. Lastly, fields 4m, 4n include a symbol which is toggled between the fields 4m, 4n when the calculation unit 5 awaits the operation of one of the keys 6a, 6b, 6a', 6b' of the key unit 6.

The operation of the toy apparatus in accordance with the preferred embodiment of the present invention will now be explained in detail with reference to FIGS. 1–5.

Figure 4A:
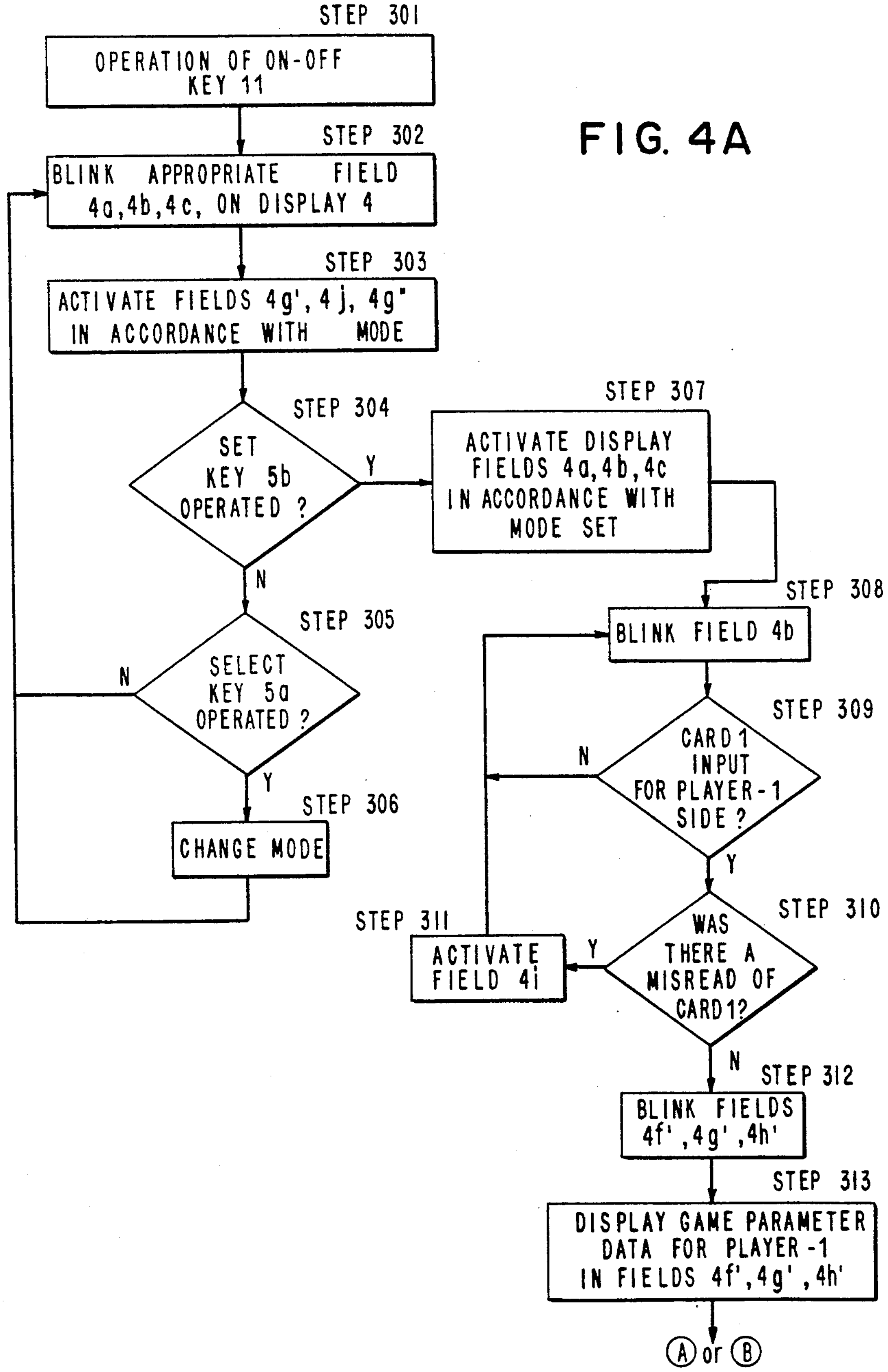
FIGS. 4A and 4B are flow charts illustrating the operation of a toy apparatus in accordance with a preferred embodiment of the present invention.

In order to simplify the discussion, steps which refer to the operation of the sound unit 10, the light unit 9, the fields 4k and 4l of display unit 4 and the operation of a time-out unit 7g (FIG. 3) will be omitted, but explained in a later section. In step 301 as shown in FIG. 4A, the toy apparatus is activated upon operation of the ON-OFF key 11. In step 302, the calculation unit 7 causes the display unit 4 to blink an appropriate one of the fields 4a, 4b, 4c on display 4 in order to indicate the game mode selected. In step 303, fields 4g', 4j, 4g'' are activated in accordance with the game mode selected. For example, in COM mode, fields 4g', 4j, 4g'' display "P (vs) C1". In step 304, the calculation unit 7 determines whether the set key 5b was operated. When the set key 5b is not operated, the calculation unit 7 determines in step 305 whether the select key 5a was operated. If not, control moves to step 302 On the other hand, when the select key 5a is operated, the calculation unit 7 changes the game mode in step 306. Control then moves to step 302 in which the selected game mode is indicated by the blinking of an appropriate one of the fields 4a, 4b, 4c.

Returning to step 304, when the set key 5b is operated, control moves to step 307 in which an appropriate one of the fields 4a, 4b, 4c is activated to indicate the mode set. In step 308, the calculation unit 7 causes the field 4b to blink to indicate that the calculation unit 7 is awaiting the input of a card 1. In step 309, the calculation unit 7 determines whether a card 1 was inserted through the card reader unit 3 for player-1. If such insertion did not occur, control moves to step 308 and the field 4b is again blinked. On the other hand, when the calculation unit 7 detects the input of a card 1 for player-1 in step 309, the calculation unit 7 determines whether a misread of the card 1 occurred in step 310. When the calculation unit 7 detects a misread, control moves to step 311 in which the calculation unit 7 courses the field **4*i* to be activated to indicate that a card misread occurred. Control then moves to step 308 in which the field 4*b* is again blinked to indicate that the calculation unit 7 is awaiting the input of a card 1. On the other hand, if no misread of the card 1 occurred in step 310, the calculation unit 7 causes the fields 4*f*', 4*g*', 4*h*' to blink in order to indicate that the read of the card 1 was successful. Control then moves to step 313 in which game parameter data for player-1 is displayed in fields 4*f*', 4*g*', 4*h*'**.

Depending upon the game mode selected, control then moves to either step 314 or step 342. In the COM mode, for example, control moves to step 342 in which the calculation unit 7 generates game parameter data for player-2. In step 343, the calculation unit 7 causes the fields **4*f*'', 4*g*'', 4*h*'' to blink and, in step 344, the calculation unit 7 causes the game parameter data generated by the calculation unit 7 in step 342 to be displayed in the fields 4*f*'', 4*g*'', 4*h*''. Control then moves to either step 320 or step 326** which are explained in a later section.

Returning to step 313, when either the B1 or B2 game mode is selected, control moves to step 314. In step 314, the calculation unit 7 causes the field **4*e* to blink to indicate that the calculation unit 7 awaits the input of a card 1 to the card reader unit 3. In step 315, the calculation unit 7 determines whether a card 1 for player-2 was input through the card reader unit 3. If not, control moves to step 314 in which the field 4*e* is blinked to indicate that the calculation unit 7 is awaiting the input of the card 1. On the other hand, when the calculation unit 7 determines that a card 1 was input through the card reader unit 3, the calculation unit 7 determines whether a misread of card 1 occurred in step 316. When the calculation unit 7 determines that a misread occurred, then in step 317 the calculation unit 7 activates field 4*i* to indicate that a misread occurred. Control then moves to step 314 in which field 4*e* is blinked in order to indicate that the calculation unit 7 is awaiting the input of the card 1. On the other hand, if no card misread occurred, then in step 318 the calculation unit 7 causes fields 4*f*'', 4*g*'', 4*h*'' to blink to indicate that the calculation unit 7 successfully obtained the game parameter data of the card from the card reader unit 3. Further, in step 319, the calculation unit 7 displays the game parameter data for player-2 in fields 4*f*'', 4*g*'', 4*h*''**.

When either the B1 or B2 game mode is selected, control then moves to step 320 or step 326. In step 320, the calculation unit 7 causes an appropriate one of the fields **4*d*, 4*e* to blink in order to indicate that the calculation unit 7 is awaiting the input of a condition card 1. In step 321, the calculation unit 7 determines whether a condition card 1 was input through the card reader unit 3. When the calculation unit 7 determines that no condition card 1 was input, control moves to step 320 in which an appropriate one of the fields 4*d*, 4*e* is blinked in order to indicate that the calculation unit 7 is awaiting the input of a condition card 1. On the other hand, when the calculation unit 7 determines that a condition card 1 was input through the card reader unit 3, control moves to step 322 in which the calculation unit 7 determines whether a misread of the condition card 1 occurred. If a misread of the condition card 1 did occur, control moves to step 323 in which the field 4*i* is activated in order to indicate to the operator that a misread of the condition card 1 occurred. Control then moves to step 320 in which an appropriate one of the fields 4*d* or 4*e* is blinked in order to indicate that the calculation unit 7 is awaiting the input of a condition card 1. On the other hand, if the calculation unit 7 determines that no misread occurred in step 322, control moves to step 324 in which a condition amount included within the game parameter data of condition card 1 is displayed in the opposite of the fields 4*f*', 4*f*'' to the power data which is affected by the condition. In step 325, the calculation unit 7 changes the game parameter data for either player-1 or player-2 in accordance with the condition amount included within the game parameter data of condition card 1. Control then moves to step 326 in B1 mode, and returns to step 320** in B2 mode.

In step 326, a proceeding decision unit **7*a* of the calculation unit 7 (FIG. 3) decides whether player-1 or player-2 is to proceed first. This decision may be based, for example, on a comparison between the game parameter data for player-1 and player-2. In step 327, the calculation unit 7 causes the fields 4*m*, 4*n* on display 4 to toggle to indicate that the calculation unit 7 is awaiting the operation of an appropriate one of the keys 6*a*, 6*b*, 6*a*', 6*b*' included within the key unit 6 depending on whether it is player-1 or player-2's turn. In step 328, the calculation unit 7 determines whether an appropriate one of the keys 6*a* or 6*a*' was operated. If so, in step 329, an on-target decision unit 7*b* of the calculation unit 7 (FIG. 3) determines whether a hit or miss occurred. The determination may be based, for example, upon the offensive data of the offensive player and the defensive data of the defensive player or merely on a predetermined ratio of hits to misses, for example. In step 330, the calculation unit 7 determines whether the result of the on-target decision unit 7*b* indicates that a miss occurred. If so, control moves to step 331 in which player turn result data is generated to activate the display field 4*i* to indicate to the operator that a miss occurred. Control then moves to step 327 in which fields 4*m*, 4*n* are toggled to indicate that the calculation unit 7 is awaiting the operation of an appropriate one of the keys 6*a*, 6*b*, 6*a*', 6*b*'** for the other player.

On the other hand, in step 330, when the calculation unit 7 determines that a miss did not occur, control moves to step 332 in which a damage calculation unit **7*c* of the calculation unit 7 (FIG. 3) generates player turn result data to determine the power amount to be deducted from an appropriate one of the numbers represented in fields 4*f*', 4*f*'', based on the amount included within fields 4*g*', 4*g*'', 4*h*', 4*h*''. In step 333, the calculation unit 7 generates player turn result data to cause the power amount to be deducted from one of the fields 4*f*', 4*f*'' to be displayed in the opposite of the fields 4*f*', 4*f*'' from that which is to be affected by the power amount deduction. In step 334, the calculation unit 7 also generates player turn result data by deducting the power amount from one of the numbers represented in fields 4*f*', 4*f*'' and displays the resulting number in fields 4*f*', 4*f*''. In step 335, the remaining power determination unit 7*d* of the calculation unit 7 (FIG. 3) determines whether the appropriate one of the numbers displayed in fields 4*f*', 4*f*'' is greater than zero. If the appropriate one of the numbers displayed in fields 4*f*', 4*f*'' is not greater than zero, in step 336, the calculation unit generates game result data to cause the fields 4*f*', 4*f*'' to display "END" to indicate the end of a game. On the other hand, when the appropriate one of the numbers displayed in fields 4*f*', 4*f*'' is greater than zero, control moves to step 327** in which the fields 4*m*, 4*n* are toggled on the display 4 to indicate that an operation of one of the keys 6*a*, 6*b*, 6*a*', 6*b*' included within the key unit 6 is awaited by the calculation unit 7 for the opposing player.

Returning to step 328, if an operation of the appropriate one of the keys 6*a* or 6*a*' is not detected by the calculation unit 7, control moves to step 337 in which the calculation unit 7 determines whether an operation of an appropriate one of the keys 6*b* or 6*b*' occurred. If not, control moves to step 327 in which the fields 4*m*, 4*n* are toggled on the display 4 to indicate that the calculation unit 7 is awaiting an operation of an appropriate one of the keys 6*a*, 6*b*, 6*a*', 6*b*' of an appropriate player. On the other hand, in step 337, when the calculation unit 7 determines that an appropriate one of the key 6*b* or 6*b*' is operated, control moves to step 338 in which a power increase unit 7*e* (FIG. 3) generates player turn result data by determining an amount of power data to be added to the existing power data of the appropriate player. In step 339, the calculation unit 7 also generates player turn result data to cause the amount of increased power data to be displayed in fields 4*f* or 4*f*'' opposite the power data to be affected. In step 340, the calculation unit 7 calculates a sum of the power data and the amount of increased power data to generate additional player turn result data, and in step 341, the calculation unit 7 causes such sum to be displayed in the appropriate field 4*f* or 4*f*'. Control then moves to step 327 in which fields 4*m*, 4*n* are toggled on the display 4 to indicate that an operation of one of the keys 6*a*, 6*b*, 6*a*', 6*b*' is awaited by the calculation unit 7.

Figure 4B:
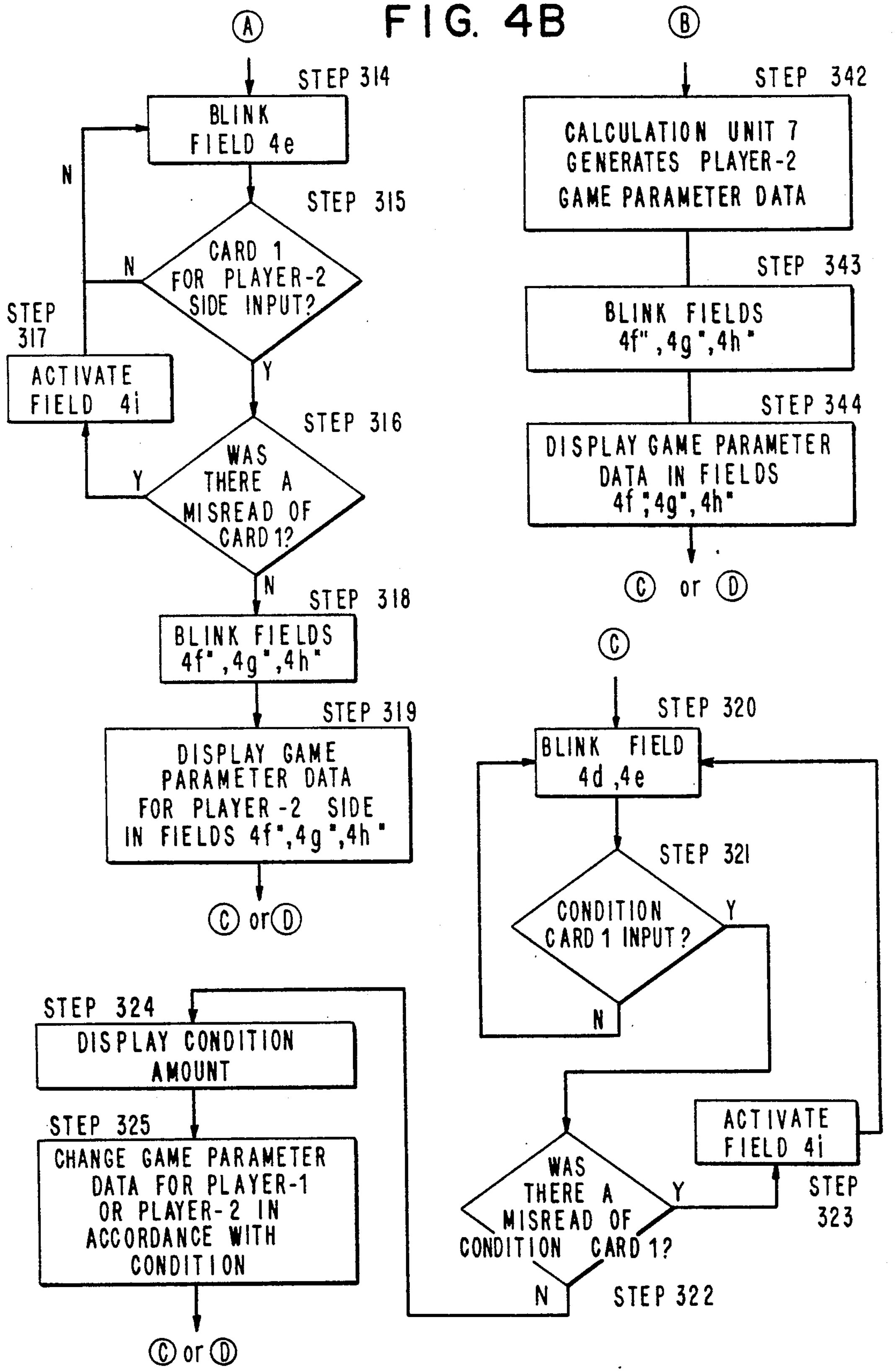
Figure 5:
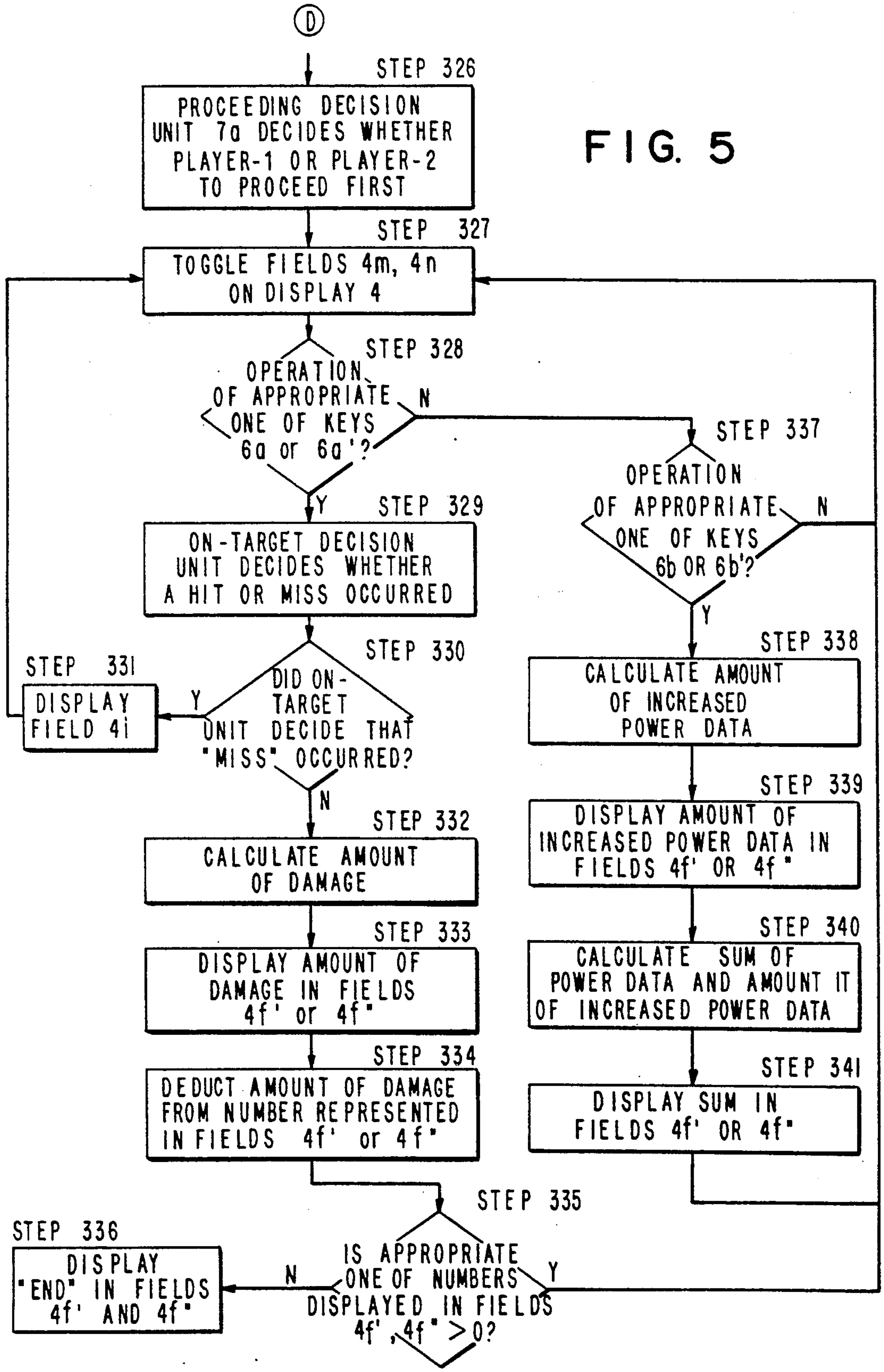
FIG. 5 is a flow chart further illustrating the operation of a toy apparatus in accordance with a preferred embodiment of the present invention.

While the operation of the sound unit 10 and the light unit 9 has been omitted from the above discussion for the sake of simplicity, it will be readily understood that the sound unit 10 and the light unit 9 can be activated by signals generated by the calculation unit 7 at predetermined points in the flowcharts of FIGS. 4A, 4B, and 5. For example, in step 301, the calculation unit 7 is designed to generate signals to indicate the operation of the ON-OFF key 11 which causes the sound unit 10 to emit a sound and the light unit 9 to emit a light. Also, the preferred embodiment of the present invention is equipped with a time out unit 7*g* which counts a waiting period whenever an operation of the keys 6*a*, 6*b*, 6*a*', 6*b*', for example, is awaited by the calculation unit 7. When the waiting period expires, the calculation unit 7 causes the toy apparatus to be placed in an off-state to preserve, for example, batteries (not shown) which may be used to power the toy apparatus. Further, the preferred embodiment of the present invention includes fields 4*k* and 4*l* which can be used to generate comments when, for example, the deduction of the amount of damage in step 334 is particularly severe to either player-1 or player-2.

The card 1 in accordance with the preferred embodiment of the present invention is a data storage medium which includes a bar code 1*a* for storing game parameter data. Also, in the preferred embodiment, the cards 1 include pictorial illustrations of character soldiers, objects or other indicia which identify the cards 1 and which attract players to collect the cards 1.

As previously explained, a player card 1 includes power at a, offensive data and defensive data. Upon insertion of the card 1, for example, in steps 309 through 310, the card reader unit 3 extracts the game parameter data from the card 1 and provides such game parameter data to the calculation unit 7. Similarly, upon the insertion of the condition card 1 in steps 321 through 322, the game parameter data extracted by the card reader unit 3 is supplied to the calculation unit 7.

While in accordance with the preferred embodiment of the present invention the card 1 includes a barcode 1*a* which stores the game parameter data, it is understood that a variety of different techniques could be used to store the game parameter data on the card 1 for machine reading. For example, a magnetic medium or a different optical medium could be used to store the data on the card 1 and the card reader unit 3 could be made to extract game parameter data from such media. Further, the game parameter data stored on a card may be selected by a user, for example, by allowing the user to select or modify the barcode, magnetic medium or optical medium by either selecting a particular barcode or set of data to place on or n a card 1, or by creating a barcode or set of data to on the card 1. Further, in addition to such media, the cards 1 may include visual printed indicia which identify the cards 1 and which attract players to collect the cards 1. Likewise, a toy apparatus of the present invention may be implemented in numerous ways. For example, while the calculation unit 7 of the preferred embodiment of the present invention includes a memory unit 7*h*, such memory unit 7*h* may be omitted from the calculation unit 7 when the calculation unit 7 has sufficient memory space in a register, for example. Also, as previously discussed, the card reader unit 3 may be utilized in a variety of ways to enable such card reader unit 3 to read game parameter data from a card, depending on the data storage medium employed by the card 1. Also, the scope of the present invention extends not only to the preferred embodiment disclosed, but extends also to a toy apparatus including a card reader unit for use with a card having game parameter data stored thereon. Further, it is clear that the game parameter data need not be limited to power data, offensive data, and defensive data of the preferred embodiment of the present invention, but may include other game parameter data for use with other games.

The embodiments of the present invention provide a toy apparatus in which a comparison of different game parameter data can be readily performed. The embodiments of the present invention also provide a toy apparatus in which game parameter data can be modified to reflect the effects of a turn result or a game result on such game parameter data. The embodiments of the present invention also provide a toy apparatus in which conditions which enhance or detract from the strength of game parameter data can be readily determined and applied to a given game. Also, the embodiments of the present invention allow an increase in the strategies which can be employed by players to modify the game parameter data.

The many features and advantages of the present invention are apparent from the detailed specification and thus, it is intended by the appended claims to cover all such features and advantages of the devices which follow in the true spirit and scope of the invention. Further, since numerous modifications and changes will readily occur to those skilled in the art, it is not desired to limit the invention to the exact construction and operation illustrated and described. Accordingly, all suitable modifications and equivalence may be resorted to as falling within the scope and spirit of the invention.

What is claimed is:

1. A toy apparatus for use with cards having barcode data associated therewith, comprising;

a card reader unit for reading the barcode associated with a card; and a calculation unit coupled to said card reader unit to receive the barcode data from said card reader unit and to calculate at least one of player turn result data and game result data, based on the barcode data, the barcode being a standard barcode which may be selected by a player from any available barcode and associated with the card.

2. A toy apparatus as claimed in claim 1, wherein said calculation unit includes a memory unit coupled to said card reader unit to receive and store the game parameter data from said card reader unit for use by said calculation unit.

3. A toy apparatus as claimed in claim 1, further comprising:

a display unit coupled to said calculation unit to generate a display based on a signal generated and supplied by said calculation unit in response to at least one of the game parameter date, the player turn result data and the game result data.

4. A toy apparatus as claimed in claim 2, further comprising:

a display unit coupled to said calculation unit to generate a display based on a signal generated and supplied by said calculation unit in response to at least one of the game parameter data, the player turn result data and the game result data.

5. A toy apparatus as claimed in claim 1, further comprising:

a sound unit coupled to said calculation unit to emit a sound based on a signal generated and supplied by said calculation unit in response to at least one of the game parameter data, the player turn result data and the game result data.

6. A toy apparatus as claimed in claim 1, further comprising:

a light unit coupled to said calculation unit to emit a light based on a signal generated and supplied by said calculation unit in response to at least one of the game parameter data, the player turn result data and the game result data.

7. A toy apparatus as claimed in claim 1, further comprising:

a key unit coupled to said calculation unit and having at least one key operable to initiate a calculation of at least one of the player turn result data and the game result data by said calculation unit.

8. A toy apparatus as claimed in claim 1, wherein said calculation unit has plural game modes, and wherein the apparatus further comprises:

a selection unit coupled to said calculation unit, including at least one key operable to select and set a selected one of the plural game modes.

9. A toy apparatus for use with cards, each of which has an associated barcode, comprising:

a housing having plural operation keys including at least two power keys and at least two battle keys;

a display coupled to said housing to display scoring data in plural display areas;

a barcode reader coupled to said housing to read a barcode associated with a card and to provide corresponding input information;

a calculation unit coupled to said display and said barcode reader to transduce the input information into point data and output said point data to said display, to modify the point data of an attacking side player when the attacking side player selects one of the power keys, to calculate a hit rate and an amount of damage of a defending side player based on the point data of both players when the attacking side player selects one of the battle keys, to increase and decrease the point data of the characters, relatively, and to output calculated results as scoring data to said display.

10. A toy apparatus as claimed in claim 9, wherein said barcode is a standard barcode which may be selected by a player from any available barcode and placed on the card.

11. A toy apparatus as claimed in claim 9, wherein said point data displayed on said display includes at least power data, offensive data and defensive data.

12. A toy apparatus as claimed in claim 9, wherein said cards include cards for power, offense and defense.

13. A toy apparatus as claimed in claim 9, wherein said operation keys include a select key.

14. A toy apparatus as claimed in claim 9, wherein said calculation unit includes a memory unit coupled to said barcode reader to receive and store point data from said barcode reader for use by said calculation unit.

15. A toy apparatus as claimed in claim 9, further comprising:

a sound unit coupled to said calculation unit to emit a sound based on a signal generated and supplied by said calculation unit in response to the scoring data.

16. A toy apparatus as claimed in claim 9, further comprising:

a light unit coupled to said calculation unit to emit a light based on a signal generated and supplied by said calculation unit in response to the scoring data.

* * * * *